United States Patent [19]

Vezirian

[11] Patent Number: 4,753,706

[45] Date of Patent: * Jun. 28, 1988

[54] METHOD FOR CHEMICALLY STRUCTURALIZING TELESCOPIC JOINTS

[76] Inventor: Edward Vezirian, 110 Firwood, Irvine, Calif. 92714

[*] Notice: The portion of the term of this patent subsequent to Feb. 17, 2004 has been disclaimed.

[21] Appl. No.: 909,610

[22] Filed: Sep. 22, 1986

Related U.S. Application Data

[63] Continuation-in-part of Ser. No. 761,826, Aug. 2, 1985.

[51] Int. Cl.$^4$ .................................................. C09J 1/00
[52] U.S. Cl. ...................................... 156/294; 29/458; 156/305; 156/325
[58] Field of Search ............... 156/294, 305, 325, 344, 156/319; 428/420, 701; 29/458, 459; 228/198, 208, 211, 207; 148/DIG. 117

[56] References Cited

U.S. PATENT DOCUMENTS

| | | | |
|---|---|---|---|
| 2,638,429 | 5/1953 | Patterson | 156/294 |
| 4,643,792 | 2/1987 | Vezirian | 156/294 |

FOREIGN PATENT DOCUMENTS

| | | | |
|---|---|---|---|
| 0556302 | 9/1943 | United Kingdom | 156/344 |

OTHER PUBLICATIONS

"Hydrogen Peroxide"; *The Merck Index;* Ninth Edition; Windholz, Editor, Merck and Co.; 1976; p. 633.

*Primary Examiner*—Michael Ball
*Assistant Examiner*—J. Davis

[57] ABSTRACT

A chemically implemented method is disclosed for producing structural connections between pairs of members, a portion of the first member being telescoped within an opening formed by and within the second member, such connections being substantially comparable in strength and rigidity to connections produced by forced fit or by thermal shrinkage methods.

Members are formed to provide for mutual fits which may range from "coarse clearance fit" to "light push fit", allowing generally for hand assembly. Prior to assembly the interfacing surfaces are coated with simple ferrous oxide. After assembly the members are clamped or supported temporarily to provide immobility to the joint during the expansive conversion of simple ferrous oxide to higher levels of ferric oxide via the introduction of hydrogen peroxide solution of at least 15% concentration into the interstices of the joint. The clamp or support is then removed leaving a strong and compressively impacted joint.

In the eventuality that the joint is to be disassembled for maintenance, repair, or transportation, a penetrating solvent solution providing a reduction reaction is used to dissolve and weaken the impacting oxides.

8 Claims, No Drawings

METHOD FOR CHEMICALLY STRUCTURALIZING TELESCOPIC JOINTS

This application is a continuation in part of prior application Ser. No. 06/761,826 filed 08/02/85.

BACKGROUND OF THE INVENTION

1. Field of the Invention

This invention pertains to the method used to produce that class of structural fit intended to prevent any relative movement between a pair of members wherein at least a portion of a first member is tightly lodged within an opening of complimentary configuration formed by and within a second member.

More specifically, this invention is directed to a chemically implemented assembly method for producing such structural fits and connections wherein precision pre-fitting of the members prior to assembly is not required, and hand or manual assembly can be done under field conditions, not requiring fixtures or presses.

2. Summary of the Prior Art

The most commonly used method of producing this class of fit is by precision machining a shaft member to be slightly larger in cross section than the precision machined complimentary opening into which it must be forced by mechanical pressure. This method is intensive in both skilled labor and equipment requirements, requiring as well the backup services of a good inspection department. When the reliability and quality of the structural connection warrants the relatively high cost, this method has generally been preferred.

Another method, generally reserved for larger diameter applications, that of thermal shrinkage fitting is commonly used. The outer member is heated to expand its dimension, and then very quickly assembled to the internal member which has been chilled or frozen. The members tend to occupy common space as their temperatures normalize.

Various clamping systems have been used to secure two telescoping parts together, typically, the hole member being split and drawn tightly around the shaft member by threaded means and a third clamping member. The connection so produced may offer certain advantages in terms of adjustability, ease of assembly and disassembly, and lowered costs, however the strength and reliability are also lowered with respect to that of joints produced by the previously described methods.

Alternatively, the shaft may be threaded and then drawn through the hole member and secured with a nut, or, both members may be threaded, assembled, adjusted, and secured with a jam nut. Such designs sometimes employ a mechanical key to provide resistance to torque loads or to disassembly.

Use of a mutually locking taper formed by the members at the joint interface, sometimes additionally secured by a threaded member, may provide a relatively strong and reliable connection, however the overall axial length of such an assembly may not be predetermined, due to the unknown makeup length required by the taper.

Of course, metallurgy permitting, the members may simply be brazed or welded together, however such a procedure tends to render future disassembly for repair, maintenance, or transportation either difficult, destructive, or impractical.

Other more elaborate devices, often resembling collet chucks, are intended to maintain torsional integrity and concentricity in power transmission equipment and the like.

SUMMARY OF THE INVENTION

An object of this invention is to provide a method of securing a structural joint between two members, one member having at least a portion thereof assembled into a complimentary opening formed by and within a second member.

Another object of this invention is to provide a method of securing such a joint, while accommodating substantial tolerances in the feature dimensions of the members, so that the members do not require precision mechanical preparations for assembly.

Yet another object of this invention is to provide a method for eventual disassembly of the subject joint.

Still another object of this invention is to provide a method of securing a rigid structural joint between two mutually telescoping members which may be easily implemented without machine shop facilities or the like, for example, as in the hand assembly of structural frames in space.

In the practice of the instant invention, the pair of members are formed to mutually telescope together, at least a portion of one member fitting within an opening formed by and within the second member, dimensionally allowing for manual assembly. The class of fit preferred ranges generally from the British "UTT" or "XTT" standards ("coarse clearance fit") to the American "light push fit". Although fits beyond this range will also work, the determining factors in the choice of fit to use are; the ultimate strength required of the connection, the cost of production, and the time required to chemically secure the joint.

The surface finish of the interlocking features is not critical. surfaces normally produced by casting and by forging are considered adequate, and yield joints generally stronger than do very smooth surfaces. The natural irregularities of the interfacing surfaces aid in forming a mechanical key within the finished joint.

The mating surfaces of at least one of the two members is provided with a coat of simple ferrous oxide. If a member is of iron base material which is not rust resistant, then a natural oxide layer may be intended by exposure to environments of oxygen, heat, water, and aqueous solution of acids or salts, alone or in combination.

Alternatively, or with members of other base materials, ferrous oxide powder may be dusted over the moistened or the dry surfaces just prior to assembly.

The members are then assembled and temporarily clamped or supported immobilized in position. If precision of alignment or of concentricity is required in the finished joint, then the members may be fixtured at this point.

A strong oxidizing agent is introduced into the joint interface by any method at hand, for example by syringe, or by dipping one or both parts just prior to assembly. A solution of hydrogen peroxide of at least 15% works very well, and has the advantage over some other choices in that it substantially does not attack unoxidized parent material over time. Hydrogen peroxide fails to promote formation of simple ferrous oxide on iron based materials, however it will react with ferrous oxide to produce higher and more complex oxides of iron which occupy larger volumes of space. Hydrogen peroxidee is generally considered to be a very useful oxidizer of organic materials and its uses are generally limited to organic reactions. Unusual care must be excerised when using hydrogen peroxide, as it is very corrosive to skin and flesh.

Hydrogen peroxide is produced commercially in standard solution concentrations of 30% and 50%. A 30% solution mixed with an equal volume of water to yield a 15% solution represents a minimum practical working solution in the practice of this invention. Stronger solutions are preferred for larger parts, looser initial fits, and higher ultimate joint strengths.

Hydrogen peroxide, the preferred solution currently for carrying out this invention, converts the simple ferrous oxide into more complex ferric oxides, while having no significant effect on the parent metal before harmlessly drying up. The oxide physically grows in this process to occupy a larger volume of space and thus to fill the interstitial voids within the joint expansively binding the joint together.

The time required to reach a desired minimum strength is dependent on several factors, such as; percentage of interstitial volume initially occupied by ferrous oxide, volume and strength of oxidizing agent introduced (additional solution may be introduced at intervals), and class of initial fit. As in any chemical reaction, temperature is a factor, however the reaction is generally exothermic enough to produce the heat required.

This expansive conversion process is self limiting, stopping completely when the joint becomes dry. Hydrogen peroxide reacts with the iron oxide, and apparently does not attack the unoxidized parent metal, although of course some temporary intermediate reactions as yet not observed may be operative. The end result is the expansive impacting and closing of the interstitial space within the joint.

An advantage of this invention is that properly sized raw castings, forgings, or wrought members may be assembled without prior machining operations.

Another advantage of this invention is that very strong structural joints may be secured by chemical and manual means, even under remote and disadvantaged field conditions.

The features of the present invention, which are believed to be novel, are set forth with particularity in the appended claims. The present invention, both as to its organization and manner of operation, together with the further advantages thereof, may better be understood by reference to the following description.

DESCRIPTION OF THE PREFERRED METHOD FOR CARRYING OUT THE INVENTION

A pair of structural members are provided wherein at least a portion of the first member is configured for ready telescopic assembly into a complimentary opening formed by and within the second member, the related dimensions, tolerances, and surface finishes being substantially optional.

Those surfaces of at least one of the members which are to be mutually interfaced at assembly are first coated with ferrous oxide. Surfaces may be naturally rusted by exposure to one or more environmental additives such as; heat, oxygen, water, and aqueous acidic or salt bearing solutions. Alternatively, the surfaces may be dusted with ferrous oxide powder. Adhesion of the powder to the subject surface may be augmented by first moistening the surface, perhaps with the working solution of hydrogen peroxide. The powder coating method is generally quicker and it may be used with members made of materials which cannot be rusted directly. Ferrous oxide powder is readily available in very pure and uniform supply and its use may thus aid in the quality control of the present process.

The members are next assembled and made temporarily immobile by means of clamps, friction, supporting surface, or a fixture.

A solution of hydrogen peroxide is introduced into the assembled joint, either by dipping or by syringe, and time is allowed in which to convert the ferrous oxide therein present into more complex ferric oxides. The oxidizer presently preferred is a hydrogen peroxide solution of at least 15% concentration.

The mechanism by which the structural joint is made rigidly solid is that of tightly impacting the interstitial spaces of the joint by chemically converting the relatively compact ferrous oxides into relatively more voluminous higher oxides of iron. A very strong structural joint can be produced in this way due largely to the tightly confined space in which this oxide expansion takes place.

The time required to develop sufficient strength to remove the immobilizing support is subject to several factors such as; class of initial fit, percentage of joint interstitial space initially occupied by ferrous oxide, and the volume and concentration of oxidizer introduced. Typically however, this time has been found to be controllable from a few minutes to about 24 hours, and thus maybe considered analogous to an adhesive setting time.

For purposes of repair, maintenance, storage, or as an aid in transporting, it may eventually become desirable to disassemble this structural joint. Such disassembly may be brought about by the application of a reducing agent in a penetrating solvent. Very effective preparations are available commercially, for example:

"Liquid Wrench", manufactured by Radiator Specially Company Charlotte, N.C. 28234 and also, for example:

"WD-40", WD-40 Company San Diego, Calif. 92110.

Interference fits assembled by pressing or by thermally shrinking are generally limited to joints with a circular cross section due to the difficult machining required to prepare the members for assembly. In the practice of the instant invention, however, members of other cross sections, for example polygonal or lobed sections, can readily be used. Such sections are often found useful for the transmission of, or resistance to, torque. The use of square or rectangular sections is very common in structural frameworks.

It should be obvious that the oxide powder could be applied in a manner other than as already described, for example, it could be simply poured into a joint after assembly if that joint were not too close fitting.

It will of course be realized that various modifications can be made in the design and operation of the present invention without departing from the spirit thereof. Thus, while the principal preferred mode and method of operation of the invention have been explained in what is now considered to represent its best embodiments, which have been described, it should be understood that within the scope of the appended claims, the invention may be practiced otherwise than as specifically described.

I claim:

1. The method of securing a rigid structural joint between a pair of mutually telescoping assembled structural members comprising the steps of:

providing a pair of mutually telescoping structural members, said members being adapted for manual assembly, coating mutually interfacing surfaces of at least one of said members with ferrous oxide, assembling said pair of members, at least a portion of one member jointly entering into a complimentary opening formed by and within the second member, providing temporary immobilizing support means for assembled said pair of members, introducing a solution of at least 15% hydrogen peroxide between assembled said pair of members.

providing time for chemical conversion of ferrous oxide into more complex oxides or iron, and removing said support means for assembled said pair of members.

2. The invention as described in claim 1 wherein said support means is a clamp.

3. The invention as described in claim 1 wherein said support means is a surface.

4. The invention as described in claim 1 wherein said support means is a fixture.

5. The method of securing a rigid structural joint between a pair of mutually telescoping assembled structural members comprising the steps of:

providing a pair of mutually telescoping structural members, said members being adapted for manual assembly.

assembling said pair of members, at least a portion of one member jointly entering into a complimentary opening formed by and within the second member, a powder of ferrous oxide provided therebetween, providing temporary immobilizing support means for assembled said pair of members, introducing a solution of at least 15% hydrogen peroxide between assembled said pair of members, providing time for chemical conversion of ferrous oxide into more complex ferric oxides to take place, and removing said temporary support means from said assembled pair of members.

6. The invention as described in claim 5 wherein said support means is a clamp.

7. The invention as described in claim 5 wherein said support means is a surface.

8. The invention as described in claim 5 wherein said support means is a fixture.

* * * * *